United States Patent
Ariki et al.

(10) Patent No.: US 6,302,498 B1
(45) Date of Patent: Oct. 16, 2001

(54) PRESSURE-ADJUSTING RESERVOIR FOR ABS AND VEHICLE BRAKE DEVICE USING THE SAME

(75) Inventors: Fumiyoshi Ariki, Anjo; Hiroyuki Shinkai, Obu; Takashi Sato, Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/389,596

(22) Filed: Sep. 3, 1999

(30) Foreign Application Priority Data

Sep. 7, 1998 (JP) .................................. 10-252814
Jul. 23, 1999 (JP) .................................. 11-209588

(51) Int. Cl.$^7$ ........................................ B60T 8/42
(52) U.S. Cl. ................................ 303/115.4; 303/115.1
(58) Field of Search ........................ 303/115.1, 115.4, 303/901; 251/315.01, 315.07, 339; 137/901, 614.14; 138/31

(56) References Cited

U.S. PATENT DOCUMENTS

| | | | | |
|---|---|---|---|---|
| 1,916,513 | * | 7/1933 | Jones | 137/606 |
| 4,155,374 | * | 5/1979 | Diehl | 137/519.5 |
| 4,290,152 | * | 9/1981 | Kesselman | 4/191 |
| 4,431,026 | * | 2/1984 | Fehrenbach et al. | 137/510 |
| 4,703,979 | * | 11/1987 | Nakanishi et al. | 303/116 |
| 4,825,903 | * | 5/1989 | Ochs et al. | 137/529 |
| 4,997,004 | * | 3/1991 | Barkhimer | 137/596.17 |
| 5,036,960 | * | 8/1991 | Schenk et al. | 188/346 |
| 5,215,359 | * | 6/1993 | Burgdorf et al. | 303/115.4 |
| 5,271,667 | * | 12/1993 | Takata et al. | 303/113.2 |
| 5,405,191 | * | 4/1995 | Nishiyama et al. | 303/113.2 |
| 5,556,175 | * | 9/1996 | Hayakawa et al. | 303/119.2 |
| 6,142,394 | * | 11/2000 | Hefler et al. | 239/533.8 |

FOREIGN PATENT DOCUMENTS

| | | | | |
|---|---|---|---|---|
| 4202388 A1 | * | 8/1993 | (DE) | 303/901 |
| 5-262218 | | 10/1993 | (JP) . | |
| 6-8810 | | 1/1994 | (JP) . | |
| 2670340 | | 7/1997 | (JP) . | |

\* cited by examiner

*Primary Examiner*—Robert J. Oberleitner
*Assistant Examiner*—Benjamin A Pezzlo
(74) *Attorney, Agent, or Firm*—Pillsbury Winthrop LLP

(57) ABSTRACT

A pressure-adjusting reservoir which can reduce an unstable movement of a ball valve therein to release a pulse of brake fluid. The pressure-adjusting reservoir has a pressure-adjusting valve constructed so that a tip portion of a pin pushes up a ball valve to open a valve hole when brake fluid reserved in a reservoir chamber is less than a predetermined amount, and the tip portion of the pin is released from the ball valve to close the valve hole when the reservoir chamber is filled with the predetermined amount of brake fluid. The tip portion of the pin has a slant surface slanting with respect to a sliding direction of the pin. In this case, the ball valve contacts with at least two portions including the slant surface and one of a part of a valve seat and inner wall of a housing, and is supported at plural portions. Therefore, the unstable movement of the ball valve can be reduced.

16 Claims, 8 Drawing Sheets

PRIOR ART

PRIOR ART

PRESSURE-ADJUSTING RESERVOIR FOR ABS AND VEHICLE BRAKE DEVICE USING THE SAME

CROSS REFERENCE TO RELATED APPLICATION

This application is based upon Japanese Patent Application Nos. Hei. 10-252814 filed on Sep. 7, 1998 and Hei. 11-209588 filed on Jul. 23, 1999, the contents of which are incorporated herein by reference.

BACKGROUND OF THE INVENTION

1. Field of the Invention

This invention relates to a pressure-adjusting reservoir and especially to a pressure-adjusting reservoir for ABS (Antilock Brake System) suitable for vehicle ABS control, and a vehicle brake device using the same.

2. Related Art

Conventional vehicle brake device for performing an ABS control using a pressure-adjusting reservoir (switch reservoir) is disclosed in Japanese patent application Laid-open No. Hei. 6-8810.

FIG. 11 shows the pressure-adjusting reservoir 200 according to a related art. The vehicle brake device using the pressure-adjusting reservoir 200 is capable of adjusting a high master cylinder pressure by a pressure-adjusting valve 201 provided to the pressure-adjusting reservoir 200. That is, the pressure-reservoir is constructed so as to prevent the high master cylinder pressure from being applied to a sucking port of a pump even if an amount of brake fluid becomes full in the pressure-adjusting reservoir, when the brake fluid in the pressure-adjusting reservoir 200 is sucked by the pump.

FIG. 12 is an enlarged partial view of the pressure-adjusting valve 201 of the pressure-adjusting reservoir 200. FIG. 12 shows a condition that the pump is operated when a brake pedal is depressed. The pressure-adjusting valve 201 will be concretely explained with reference to this figure.

The pressure-adjusting valve 201 is constructed by a ball valve 202, a valve seat 203, and a pin 205 interlocked with a reservoir piston 204 (see FIG. 11). When the pressure-adjusting reservoir 200 has an enough space into which the brake fluid flows and the ball valve 202 is separated from the valve seat 203 by the pin 205, the pressure-adjusting valve 201 allows the brake fluid to flow to the pressure-adjusting reservoir 200 through a gap between the ball valve 202 and the valve seat 203. On the contrary, when the pressure-adjusting reservoir 200 has not enough space into which the brake fluid flows, the ball valve 202 contacts with the valve seat 203 so that the pressure-adjusting valve 201 stops the brake fluid flowing to the pressure-adjusting reservoir 200.

However, as shown in this figure, the pin 205 of the conventional pressure-adjusting reservoir 200 is formed so that a seat face 205a contacting with the ball valve 202 is perpendicular to an axis of the pin 205. Therefore, the ball valve 202 may unstably move and this movement may cause a pulse of the brake fluid pressure or the like.

Especially, when the ball valve 202 is pushed up toward the pin 205 by a spring 206, the unstable movement of the ball valve 202 becomes remarkable by an action of a spring force and a fluid force applied to the ball valve 202.

SUMMARY OF THE INVENTION

This invention has been conceived in view of the background thus far described and its first object is to reduce an unstable movement of a ball valve.

According to the present invention, a pin has a tip portion having a slant portion substantially slanted with respect to a slide direction of the pin. In this case, a ball valve can be contacted at plural portions including the slant portion of the pin and another portion (e.g., an inside wall of a housing in which the ball valve is to be arranged), and can be stable without unstable movement.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

DESCRIPTION OF THE PREFERRED EMBODIMENTS

[First Embodiment]

Figure 1:
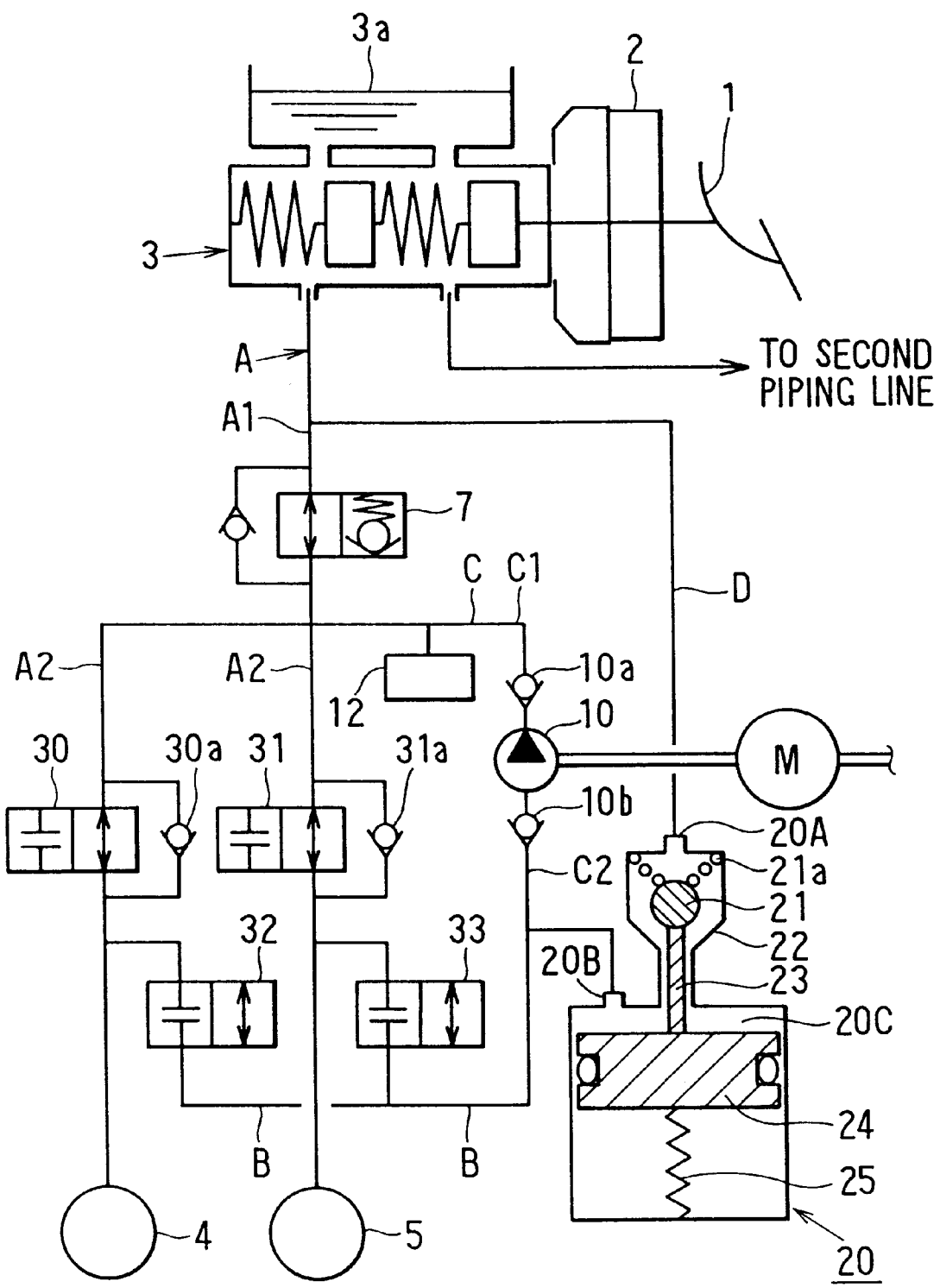
FIG. 1 is a schematic diagram of a brake device which adopts a pressure-adjusting reservoir 20 for ABS according to the present invention.

FIG. 1 shows a schematic diagram of a conduit system of a brake system adopting a pressure-adjusting reservoir for ABS according to a first embodiment. A basic construction of the brake device will be explained hereinafter with reference to FIG. 1. In this embodiment, the brake device is adopted to a front-wheel drive four-wheel vehicle that has an X-conduit oil hydraulic circuit having a front-right-wheel/rear-left-wheel conduit system and a front-left-wheel/rear-right-wheel conduit system.

As shown in this figure a brake pedal 1, which is depressed by a driver when a braking force is applied to the vehicle, is connected to a brake booster 2, which boosts a brake depression force of the driver.

The brake booster 2 includes a push rod and so on to transmit the boosted depression force to a master cylinder 3. A master cylinder pressure is generated by pushing up a master piston provided in the master cylinder 3 by the push rod. The brake pedal 1, the brake booster 2 and the master cylinder 3 constitutes brake fluid pressure generating means.

Here, a master reservoir 3a is connected to the master cylinder 3 to supply the brake fluid into the master cylinder 3 and to reserve excess brake fluid in the master cylinder 3.

The master cylinder pressure is transmitted to a wheel cylinder 4 for a front-right-wheel FR and a wheel cylinder 5 for a rear-left-wheel RL, that is, vehicle braking force generating means, through an Antilock Brake System (ABS). This embodiment will be explained regarding the front-right-wheel FR and the rear-left-wheel RL as a first conduit system, however, the explanation regarding the front-left-wheel FL and the rear-right-wheel RR as a second conduit system is omitted because it is almost the same as that of the front-right-wheel FR and the rear-left-wheel RL.

Furthermore, the brake device includes a conduit (main conduit) A connected to the master cylinder 3, and a differential pressure control valve 7 is provided to the conduit A. The conduit A is divided into two portions by the differential pressure control valve 7. That is, the conduit A is divided into a conduit A1 that receives the master cylinder pressure between the master cylinder 3 and the differential pressure control valve 7, and a conduit A2 that is defined by a portion from the differential pressure control valve 7 to each wheel cylinders 4, 5.

The differential pressure control valve 7 switches between a communicating condition and a differential pressure condition. The differential pressure control valve 7 is normally set to the communicating condition. When the differential pressure control valve 7 is switched to the differential pressure condition, it can maintain the wheel cylinder sides 4, 5 to have pressure higher than that of the master cylinder 3 side by a predetermined differential pressure.

At the conduit A2, the conduit A is branched into two conduits. At one branched conduit, a pressure increasing valve 30 is provided in order to increase the brake fluid pressure to the wheel cylinder 4, and at another branched conduit, a pressure increasing valve 31 is provided in order to increase the brake fluid pressure to the wheel cylinder 5.

Each of these pressure increasing valves 30, 31 is formed as a two-position valve, which can switch communicating/cutting-off condition by an Electronic Control Unit (ECU) for ABS. When the two-position valve is switched to the communicating condition, the brake fluid pressure based on the master cylinder pressure or the like can be applied to each wheel cylinders 4, 5.

Here, in the case of the normal brake when the ABS control is not performed, these pressure increasing valves 30, 31 are normally controlled to the communicating condition. Here, safety valves 30a, 31a are provided parallel to the pressure increasing valves 30, 31, respectively, to discharge the brake fluid from the wheel cylinders 4, 5 in accordance with being released of the brake pedal 1 during ABS control.

The conduit A between the pressure increasing valves 30, 31 and the wheel cylinders 4, 5 is connected to a reservoir hole 20B of the pressure adjusting reservoir 20 through a conduit B. It can prevent the wheels from being locked by controlling the brake fluid pressure in the wheel cylinders 4, 5 by discharging the brake fluid to the pressure-adjusting reservoir 20 through the conduit B. A construction of the pressure-adjusting reservoir 20 will be explained in detail later.

At the conduit B, pressure decreasing valves 32, 33, which can switch communicating/cutting-off condition by the ABS ECU, are provided. These pressure decreasing valve are normally set to the cutting-off condition during the normal brake condition (Non ABS control), and are switched to the communicating condition when the brake fluid is to be discharged to the pressure-adjusting reservoir 20.

A rotary pump portion (herein after, "pump") 10 and a safety valve 10a are provided to a conduit C, which connects: the conduit A where between the differential pressure control valve 7 and the pressure increasing valves 30, 31; and the reservoir hole 20B of the pressure-adjusting reservoir 20. The conduit C is divided into a conduit C1 at upstream side and a conduit C2 at downstream side by the pump 10.

An accumulator 12 is provided at the upstream side of the pump 10 in the conduit C in order to release the pulse of the brake fluid discharged from the pump 10. A conduit D is provided to connect the reservoir hole 20A and the master cylinder 3. The pump 10 draws the brake fluid from the conduit A1 through the conduit D and the pressure-adjusting reservoir 20, and discharges to the conduit A2 in order to increase the wheel cylinder pressure.

Figure 2:
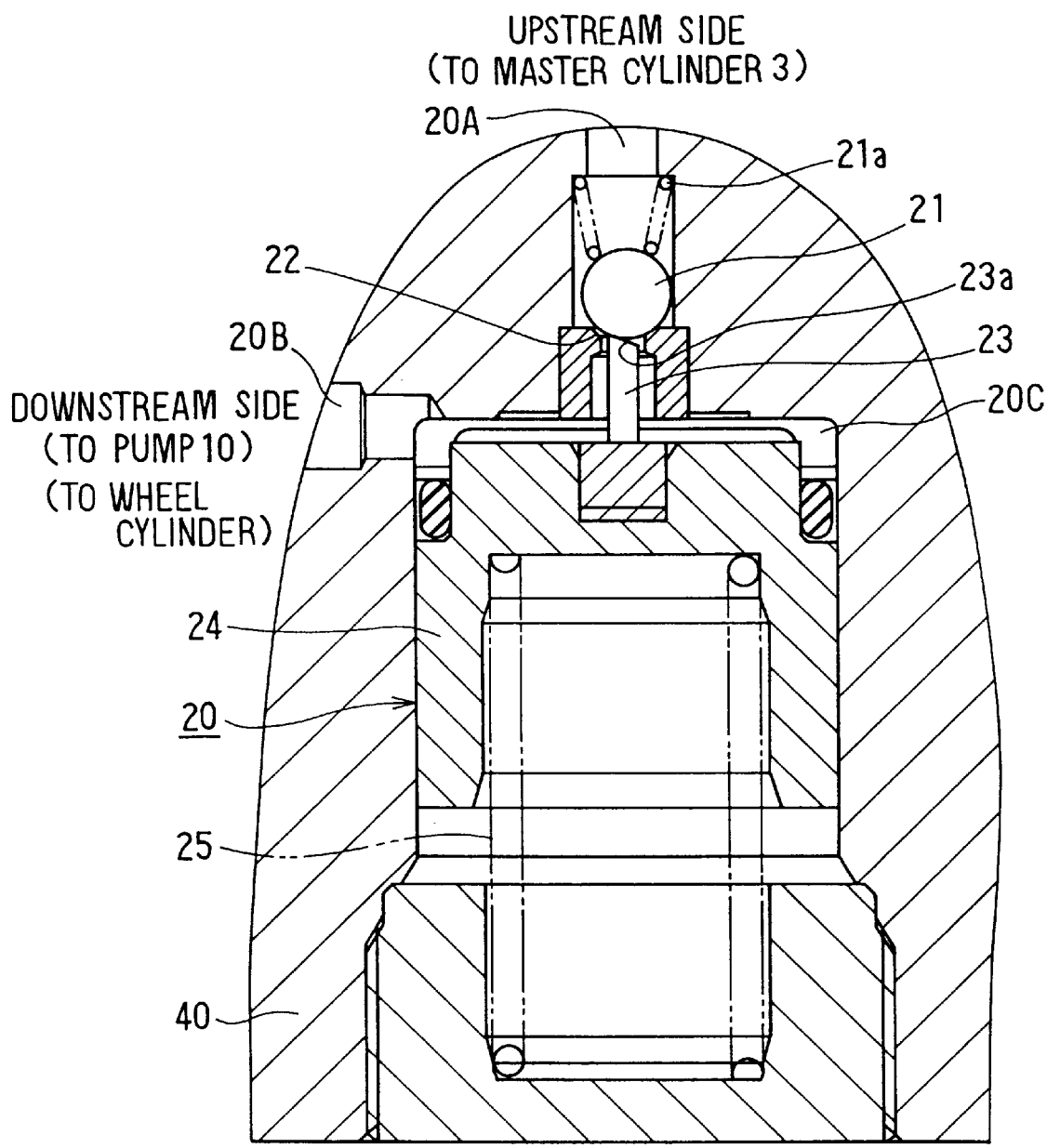
FIG. 2 is a sectional view of the pressure-adjusting reservoir 20 according to a first embodiment.

Next, the construction of the pressure-adjusting reservoir 20 will be explained in detail with reference to FIG. 2. FIG. 2 shows a sectional view of the pressure-adjusting reservoir 20. The pressure-adjusting reservoir 20 is built in a housing 40, which forms an outer core of the ABS actuator. The pressure-adjusting reservoir 20 is connected between the master cylinder 3 and the pump 10, and has a reservoir hole 20A, which receives a flow of the brake fluid from the conduit D having a pressure substantially equal to the master cylinder pressure. Furthermore, the pressure-adjusting reservoir 20 has a reservoir hole 20B, which is connected to the conduit B and receives the brake fluid discharged during the ABS control.

A ball valve 21 is provided inside of the reservoir hole 20A in the pressure-adjusting reservoir 20. The ball valve 21 is hold by being pushed up by the spring 21a toward the valve seat 22, which constitutes a valve hole.

At a lower side of the ball valve 21, the pin 23, which has a predetermined stroke and vertically moves the ball valve 21 by sliding inside the valve hole, is provided separately from the ball valve 21. The pin 23 has the valve face 23a formed by a slant surface having a predetermined angle with respect to an axis direction (sliding direction) of the pin 23. The ball valve 21 is positioned at the slant surface side by the slanted valve face 23a of the pin 23. Here, the ball valve 21, the valve seat 22 and pin 23 constitutes a pressure-adjusting valve.

In other words, the tip portion of the pin 23 has a contact face to be contacted with the ball valve 21, and the contact face is formed so that a center line connecting a center of the ball valve 21 and a contact point between the contact face and the ball valve 21 is different from the axis of the pin 23.

In a reservoir chamber 20C, a piston 24 interlocked with the pin 23 and a spring 25 that generates a spring force to upwardly push up the piston 24 to discharge the brake fluid in the reservoir chamber 20C.

When the brake fluid is flown from the reservoir hole 20B, the piston 24 slides downward so that the brake fluid is reserved in the reservoir chamber 20C. In this time, the pin 23 moves downward in accordance with the movement of the piston 24, and the ball valve 21 is seated to (contacted with) the valve seat 22 to cut off between the conduit D and a sucking side of the pump 10.

In this way, after the brake fluid corresponding to a stroke length is stored in the reservoir chamber 20C, the conduit C is cut off from the sucking port side of the pump 10 by the ball valve 21 and the valve seat 22. Therefore, when the brake fluid more than a suck capacity of the pump 10 is flown into the reservoir chamber 20C in accordance with decreasing of the wheel cylinder pressure as a result of the ABS control, the flow of the brake fluid from the master cylinder side to the reservoir chamber 20C is cut off by the valve seat 22 and the ball valve 21 as a valve body.

Figure 3A:
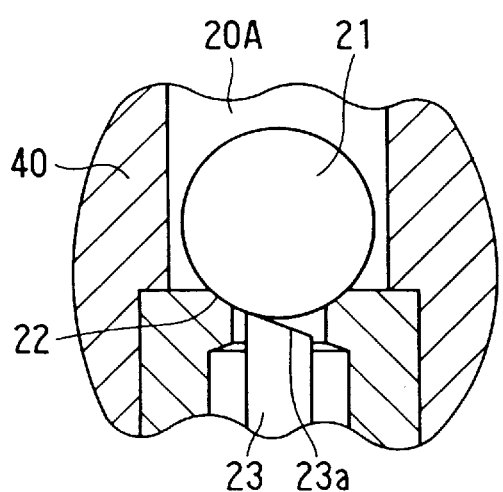
FIGS. 3A through 3C are sectional views illustrating a portion closed to a pin 23 of the pressure-adjusting reservoir 20, for explaining an operation of the pressure-adjusting reservoir 20 shown in FIGS. 1, 2.
Figure 3B:
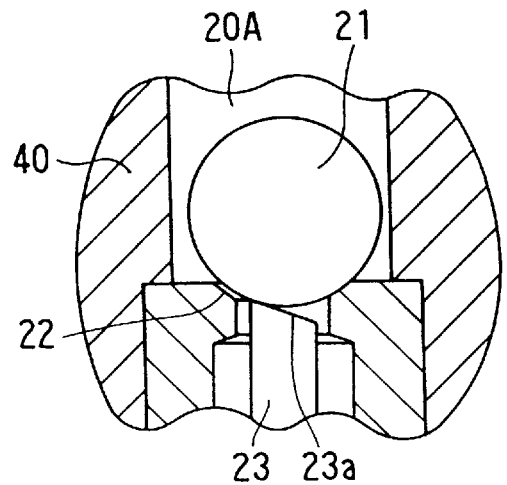
Figure 3C:
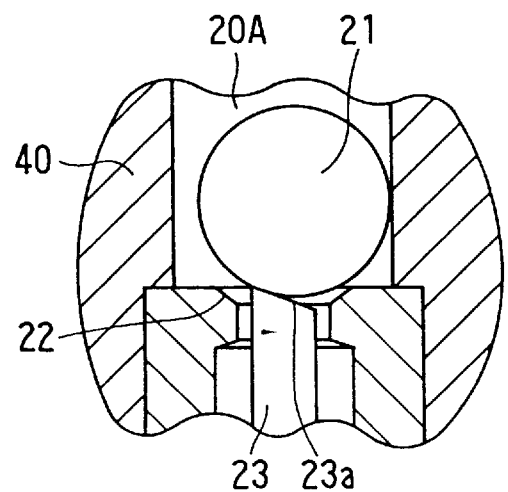

Next, an operation of the brake device having the pressure-adjusting reservoir 20 Constructed in this way will be explained. FIGS. 3A through 3C are sectional views illustrating a portion closed to the ball valve 21 during the operation, and show positions of the ball valve 21.

When it is in the normal brake condition in which neither the ABS control nor an assist control is performed, the differential pressure control valve 7 is set to the communicating condition. Therefore, the master cylinder pressure generated by the depression of the brake pedal 1 by the driver is directly applied to the wheel cylinders 4, 5. Here, since the pump 10 is not operated, the ball valve 21 is positioned so as to contact with the valve seat 22, as shown in FIG. 3A. Therefore, the master cylinder pressure is not applied to the sucking port side of the pump 10.

When the braking force should be enlarged than that in the normal brake condition, for example when a vehicle deceleration detected by a not-shown acceleration sensor or the like exceeds a predetermined threshold value, that is when the brake fluid pressure should be generated so as to assist the depression of the brake pedal 1 by the driver, the differential pressure control valve 7 is set to the differential pressure condition. Hence, the brake fluid is flown from the conduit A1 to the pressure-adjusting reservoir 20 through the conduit D. After that, the brake fluid in the pressure-adjusting reservoir 20 is supplied to the conduit A2 by being sucked and discharged by the pump 10. Accordingly, the wheel cylinder pressure is kept to be higher than the master cylinder pressure by the differential pressure control valve 7 being set to the differential pressure condition.

Here, since the brake fluid in the reservoir chamber 20C is sucked to the pump 10 as well as being flown from the master cylinder side, the ball valve 21 is seated on both the valve seat 22 and the slant surface of the pin 23, as shown in FIG. 3B. That is, since a tip portion of the pin 23 has the slant surface, the ball valve 21 can be positioned by the slant surface of the pin 23 and a part of the valve seat 22. In this case, since the ball valve 21 is contacted at plural portions, the ball valve 21 can be stable at that position without unstable movement. Therefore, the pulse of the brake fluid pressure due to the unstable movement of the ball valve 21 can be prevented from generation.

When a predetermined amount of the brake fluid is reserved in the reservoir chamber 20C because a sucking capacity of the pump 10 can not catch up with a brake fluid amount flown into the reservoir chamber 20C, the ball valve 21 seats the valve seat 22, as shown in FIG. 3A so as to cut off the conduit A1 (master cylinder side) and the sucking portion of the pump 10. Thereafter, when the brake fluid in the reservoir chamber 20C is sucked by the pump 10, the brake fluid amount in the reservoir chamber 20C decreases, and the pin 23 pushes up the ball valve 21 so as to supply the brake fluid from the master cylinder side to the reservoir 20C. Therefore, the high brake fluid pressure due to the depression of the brake pedal 1 by the driver is decreased by the pressure-adjusting reservoir 20 so as to prevent the sucking portion of the pump 10 from being applied the high brake fluid pressure. Accordingly, it can prevent a leakage of the brake fluid from the pump 10, and can improve a discharge capacity of the pump 10.

When the brake pedal 1 is not depressed, since the pump 10 is not operated and the master cylinder pressure is low, the ball valve 21 is pushed up to the maximum point by the pin 23. Here, since the tip portion of the pin 23 is formed to the slant surface, the ball valve is positioned to as to contact with both the slant surface of the pin 23 and the inside wall of the conduit D. In this way, since the ball valve 21 contacts at plural portions, the ball valve 21 does not unstably move.

In this way, since the ball valve 21 is positioned by being contacted at plural portions wherever the ball valve 21 may be held by being pushed up by the pin 23, the unstable movement of the ball valve 21 can be prevented from generation by the slant surface of the tip of the pin 23.

In the case of the brake device in which the sucking port side of the pump 10 is connected at downstream side of the pressure-adjusting valve, the unstable movement of the ball valve likely to become remarkable by an action of the spring force and the fluid force applied to the ball valve 21. However, the unstable movement of the ball valve 21 can be effectively reduced even in the brake device by having the slant surface at the tip portion of the pin 23.

[Second Embodiment]

Figure 4:
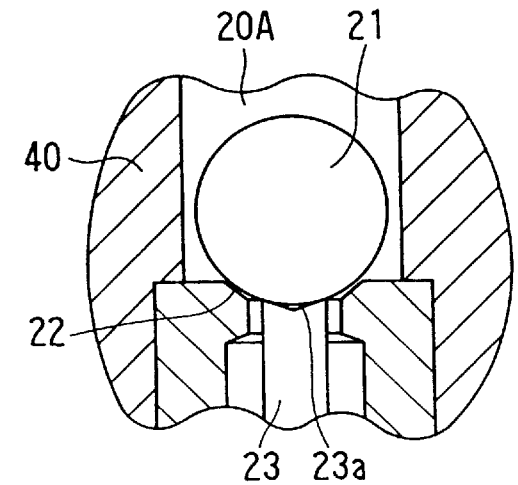
FIG. 4 is a sectional view illustrating a portion closed to the pin 23 of the pressure-adjusting reservoir 20 according to a second embodiment.

In the first embodiment, the valve face 23a of the pin 23 is slanted to one direction. On the contrary, in this second embodiment, the tip portion of the pin 23 has a recess surface having a conical shape, as shown in FIG. 4, to prevent the valve face 23a from being perpendicular to the axis of the pin 23.

Here, the recess has a radius of curvature to or small than a radius of the ball valve 21. Since the ball valve 21 can be supported by plural portions or by face of the tip portion of the pin 23 by providing the recess at the tip portion of the pin 23, the unstable movement of the ball valve 21 can be effectively reduced. Therefore, the pulse of the brake fluid pressure due to the unstable movement of the ball valve 21 can be prevented from generation.

[Third Embodiment]

Figure 5A:
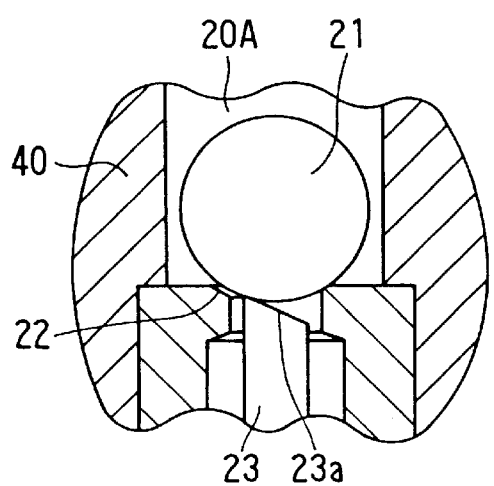
FIG. 5A is a sectional view illustrating a portion closed to the pin 23 of the pressure-adjusting reservoir 20 according to a third embodiment.
Figure 5B:
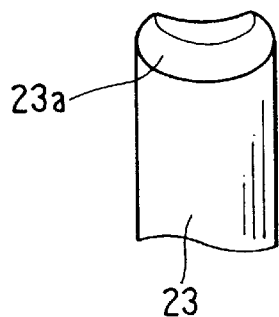
FIG. 5B is a perspective view of the pin 23 shown in FIG. 5A.

In the first embodiment, the valve face 23a of the pin 23 is slanted to one direction. On the contrary, in this third embodiment, the tip portion of the pin 23 to be contacted with the ball valve 21 is further changed in addition to the slant surface. FIG. 5A is an enlarged sectional view illustrating a portion closed to the ball valve 21 of the pressure-adjusting reservoir 20 according to this embodiment. FIG. 5B is a perspective view of the pin 23 seen from the right side in FIG. 5A.

As shown in these figures, the valve face 23a of the pin 23 has a recessed slant surface in which a recess portion is formed at the portion where the ball valve 21 is to be contacted so that the ball valve 21 is fitted into the recess portion. This recess portion has a radius of curvature equal to a radius of the ball valve 21 so that the ball valve 21 contacts with substantially whole area of inside surface of the recess portion.

In this way, the ball valve 21 can be supported with reliability by further recessing the slanted tip portion of the pin 23.

[Fourth Embodiment]

In the first to third embodiments, the ball valve is supported to the predetermined position by modifying the shape of the tip portion of the pin 23. On the contrary, in this embodiment, the ball valve 21 is supported to the predetermined position by using another member in addition to the pin 23.

Figure 6:
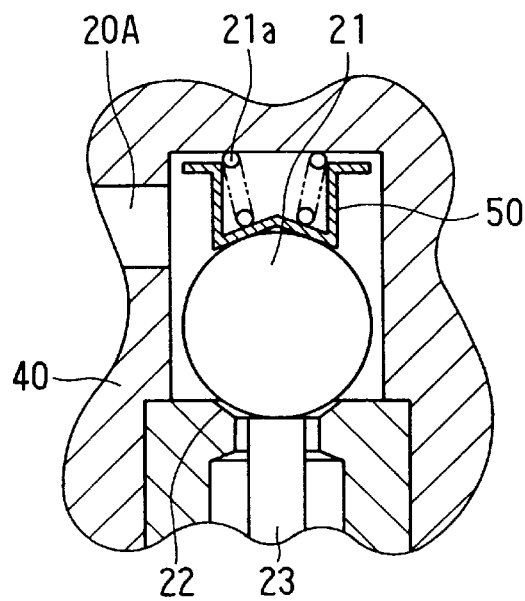
FIG. 6 is a sectional view illustrating a portion closed to the pin 23 of the pressure-adjusting reservoir 20 according to a fourth embodiment.

FIG. 6 is a sectional view illustrating a portion closed to the ball valve 21 of the pressure-adjusting reservoir 20 according to this embodiment. As shown in this figure, the reservoir hole 20A is transversally extended with respect to the ball valve 21, and a guide 50 is provided. The guide 50 has a recess portion having a conical shape at a portion where the ball valve 21 is to be contacted, and arranged at one end of a spring 21a, which generates spring force toward the ball valve 21.

Since the ball valve 21 can be fitted to the conical-shaped recess formed in the guide 50, the ball valve 21 can be held to the predetermined position by being supported at plural portions.

[Fifth Embodiment]

Figure 7:
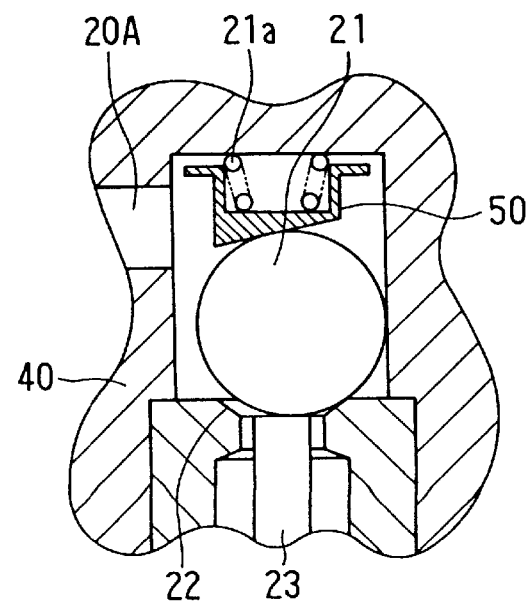
FIG. 7 is a sectional view illustrating a portion closed to the pin 23 of the pressure-adjusting reservoir 20 according to a fifth embodiment.

FIG. 7 is a sectional view illustrating a portion closed to the ball valve 21 of the pressure-adjusting reservoir 20 according to this embodiment.

In the fourth embodiment, the guide 50 having the conical-shaped recess at its tip is used, however, the guide 50 may have a slant surface slanted to one direction at the tip of the guide so that the ball valve is supported at plural portions by using the slant surface and the valve seat 22. In this way, the ball valve 21 can be held to the predetermined position by slanting the tip portion of the guide 50.

[Modified Embodiment]

In the first embodiment, the brake device using the pressure-adjusting reservoir 20 is explained with reference to the conduit system shown in FIG. 1, however, the pressure-adjusting reservoir 20 according to the present invention may be adopted to the other brake device having another conduit system.

Figure 8:
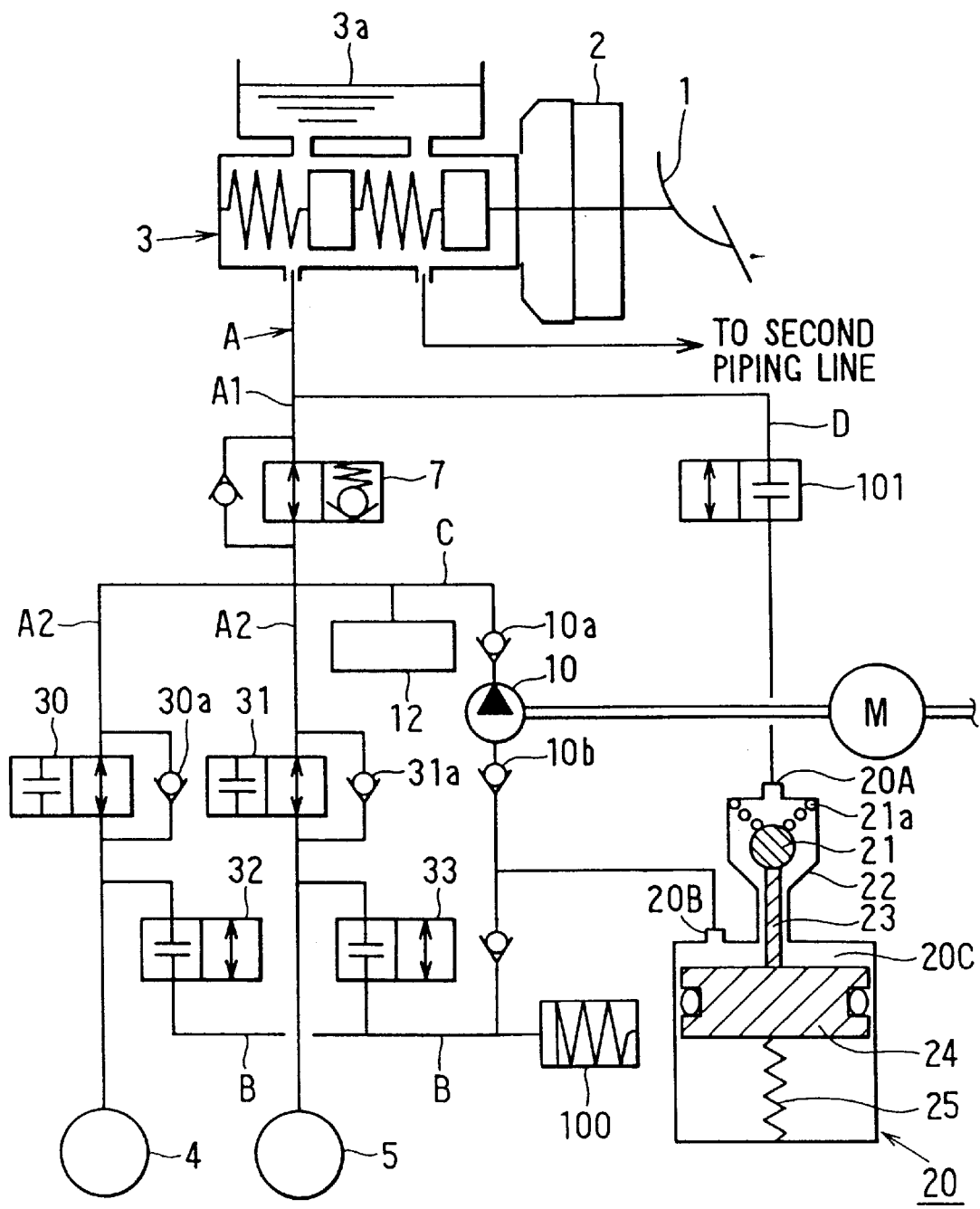
FIG. 8 is a schematic diagram of a brake device which adopts a pressure-adjusting reservoir 20 for ABS according to a first modified embodiment.

For example, as shown in FIG. 8, the pressure-adjusting reservoir 20 of the present invention can be adopted to a brake device in which the capacity of the pressure-adjusting reservoir 20 is set to relatively small and an additional reservoir 100 is provided to release the brake fluid thereto during the ABS control. Here, a control valve 101 may be provided at the conduit D to control communicating/cutting-off condition of the conduit D.

Figure 9:
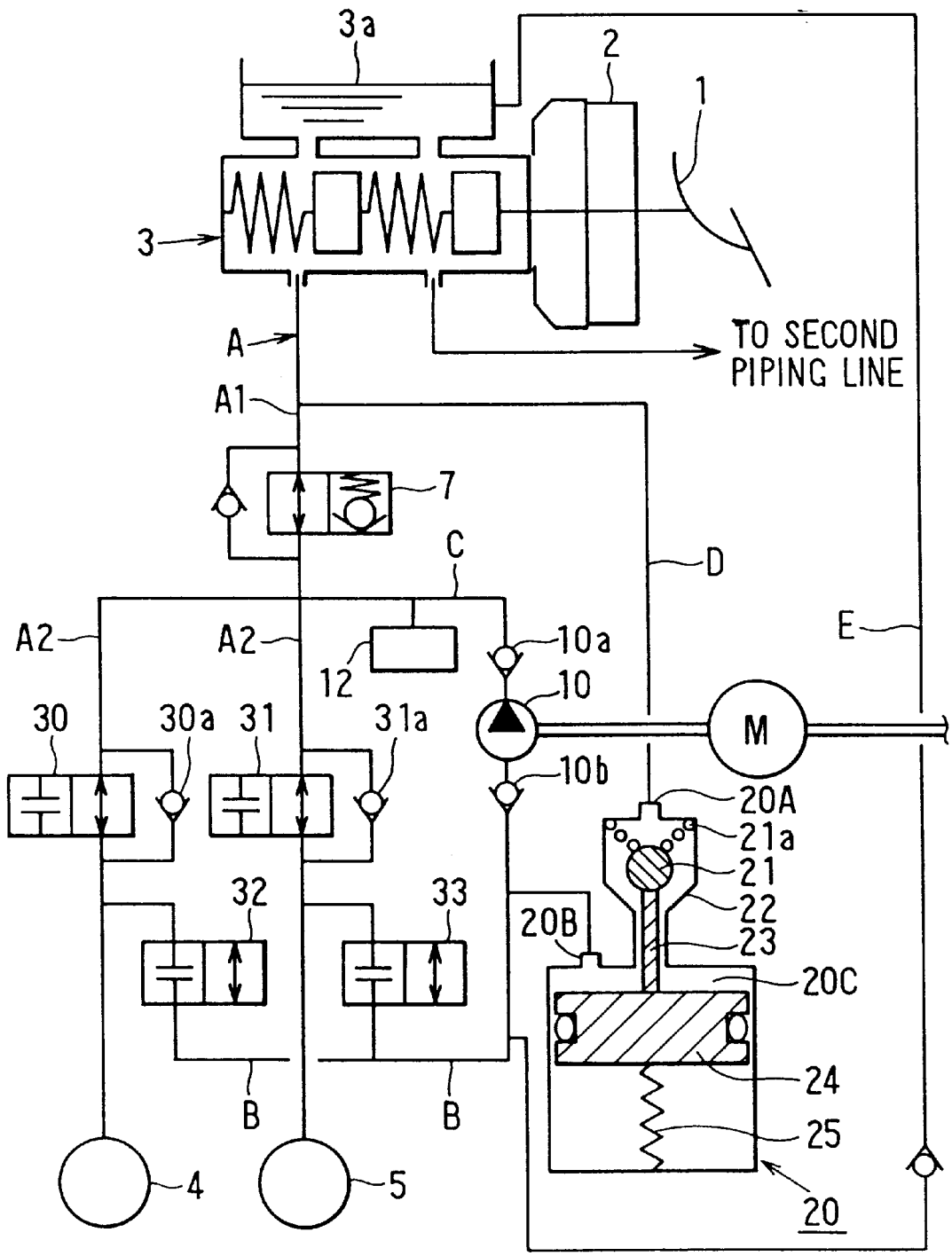
FIG. 9 is a schematic diagram of a brake device which adopts a pressure-adjusting reservoir 20 for ABS according to a second modified embodiment.

Furthermore, as shown in FIG. 9, the pressure-adjusting reservoir 20 of the present invention can be adopted to a brake device in which a conduit E, which connects the master reservoir 3a and the pump 10, is further provided so that the brake fluid can be supplied from not only the master cylinder 3 but the master reservoir 3a.

In the second embodiment, the recess is explained by using the conical shaped recess, however, the recess may formed into the other shape when the valve seat 23a of the pin 23 has a slant portion not perpendicular to the axis of the pin 23.

In the first embodiment, whole surface of the seat face 23a of the pin 23 is slanted, however, it does not need to form the slant surface at the whole area of the tip portion (seat face). That is, the above effect is obtained when the seat face 23a has a portion not perpendicular to the axis of the pin 23, at which the ball valve 21 is to be contacted.

Figure 10:
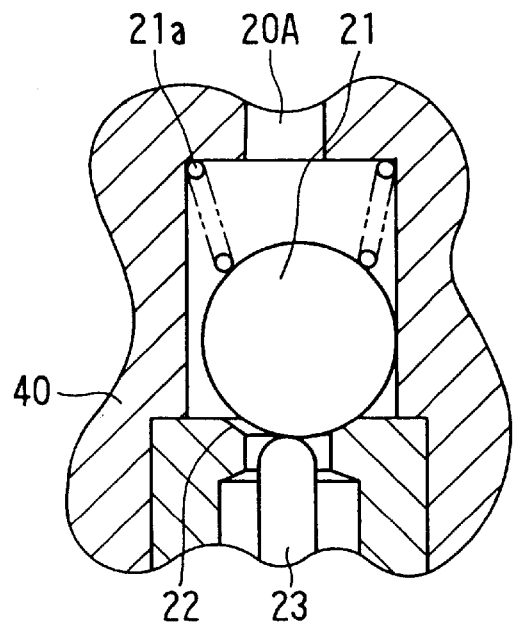
FIG. 10 is a sectional view illustrating a portion closed to a ball valve 21 of the pressure-adjusting reservoir 20 according to a third modified embodiment.
Figure 12:
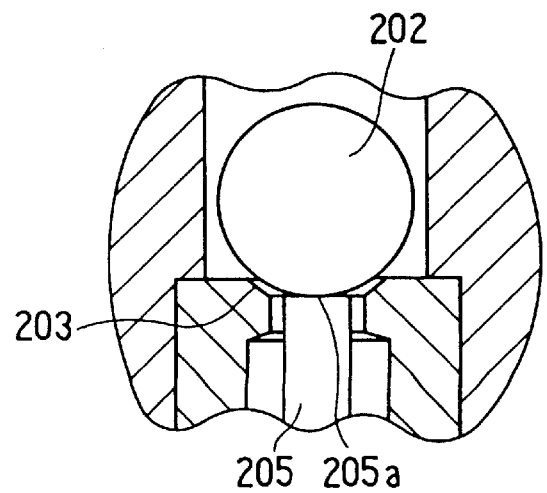
FIG. 12 is a diagram illustrating a portion closed to a pin 23 of the pressure-adjusting reservoir 20, for explaining an operation of the pressure-adjusting reservoir 20 shown in FIG. 11.
Figure 11:
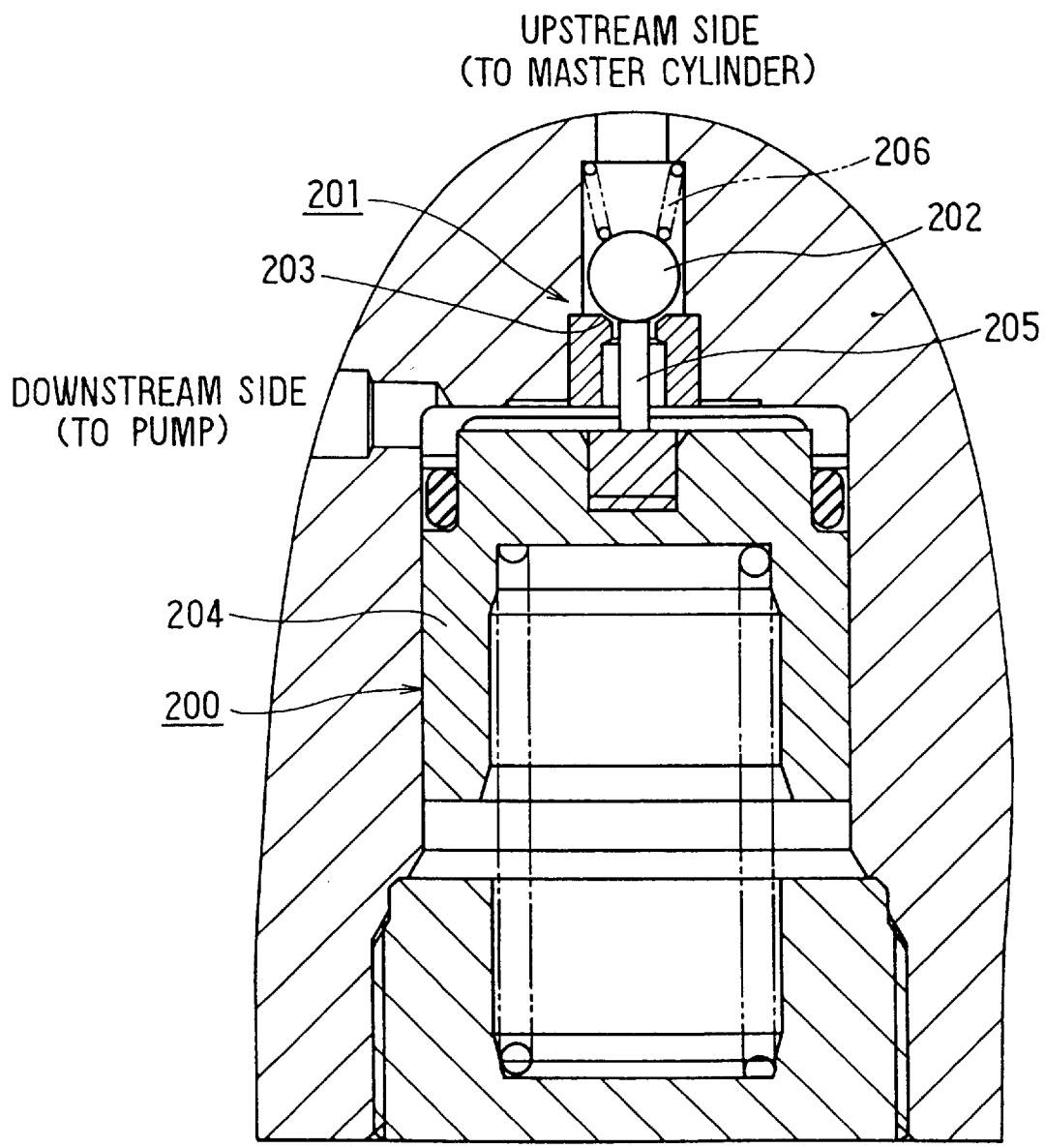
FIG. 11 is a sectional view of the pressure-adjusting reservoir 20 according to a related art.

For example, as shown in FIG. 10, the slant surface can be substantially formed at the tip of the pin 23 by rounding the tip of the pin 23. In this case, the ball valve 21 can be held at plural portions by rounded tip portion of the pin 23 and the valve seat 22.

In the above-mentioned embodiments, the ball valve 21 is pushed up toward the valve seat 22 by the spring 21a, however, the spring 21a may be omitted to have the ball valve 21 non-support condition. In this case, since there is not the spring force applied to the ball valve 21, the unstable movement of the ball valve 21 due to an action of the spring force and the fluid force can be further prevented. Therefore, the pulse of the brake fluid pressure due to the unstable movement of the ball valve 21 can be prevented from generation.

In the above-mentioned first embodiment, it does not need to form the slant surface to flat, and the slant surface may be formed to step-wise surface gradually sloped from one end to another end.

What is claimed is:

1. A pressure-adjusting reservoir, comprising:
   a housing having a conduit;
   a pressure-adjusting valve provided in the housing, including:
      a valve seat having a valve hole;
      a pin slidably inserted in the valve hole, including a tip portion having a single slant portion substantially slanted with respect to a slide direction; and
      a ball valve provided in the conduit, for opening the valve hole by separating from the valve seat and closing the valve hole by contacting with the valve seat;
   a reservoir chamber provided in the housing to communicate with the valve hole and positioned at downstream of the pressure-adjusting valve; and
   a reservoir piston slidably inserted in the reservoir chamber and interlocked with the pin,
   wherein the pin pushes up the ball valve with the tip portion to open the valve hole when fluid reserved in the reservoir chamber is less than a predetermined amount, and the valve hole is closed by the ball valve when the reservoir chamber is filled with the predetermined amount of fluid and
   wherein the slant portion of the tip portion of the pin defines a plane which is slanted toward a direction away from the slide direction of the pin.

2. A pressure-adjusting reservoir according to claim 1, wherein the slant surface has a recess portion at a portion where the ball valve is to be contacted with, the recess portion has a shape substantially the same as a shape of a part of the ball valve.

3. A pressure-adjusting reservoir according to claim 1, wherein the slant portion has a recess portion at a portion where the ball valve is to be contacted with.

4. A pressure-adjusting reservoir according to claim 3, wherein the recess portion is formed in conical shape.

5. A pressure-adjusting reservoir according to claim 1, wherein the ball valve is in a non-supporting condition in which the ball valve is not pushed toward the valve seat so that the ball valve can be released from the pin and the valve seat.

6. A pressure-adjusting reservoir, comprising:
   a housing having a conduit;
   a pressure-adjusting valve provided in the housing, including:
      a valve seat having a valve hole;
      a pin slidably inserted in the valve hole;

a ball valve provided in the conduit, for opening the valve hole by separating from the valve seat and closing the valve hole by contacting with the valve seat;

a spring for generating a spring force toward the pin side; and a guide provided between the ball valve and the spring, for pushing the ball valve toward the pin side by the spring force, and having a single slant portion substantially slanted with respect to a slide direction of the pin;

a reservoir chamber provided in the housing to communicate with the valve hole and positioned at downstream of the pressure-adjusting valve; and a reservoir piston slidably inserted in the reservoir chamber, and interlocked with the pin, wherein the pin pushes up the ball valve with the tip portion to open the valve hole when fluid reserved in the reservoir chamber is less than a predetermined amount, and the valve hole is closed by the ball when the reservoir chamber is filled with the predetermined amount of fluid, and wherein the slant portion of the guide defines a plane which is slanted toward a direction away from the slide direction of the pin.

7. A pressure-adjusting reservoir according to claim 6, wherein the slant portion has a recess portion at a portion where the ball valve is to be contacted with.

8. A brake device, comprising:

brake fluid pressure generating means for generating a brake fluid pressure based on a depression force;

a main conduit connected to the brake fluid pressure generating means, for transmitting the brake fluid pressure;

braking force generating means connected to the main conduit, for generating a braking force at wheels based on the brake fluid pressure;

a auxiliary conduit connected to the main conduit;

a pump provided to the auxiliary conduit, for supplying brake fluid to the main conduit through the auxiliary conduit to boost the braking force generated by the braking force generating means; and a pressure-adjusting reservoir connected to the brake fluid pressure generating means and the auxiliary conduit, comprising:

a housing having a conduit;

a pressure-adjusting valve provided in the housing, having an upstream side connected to the brake fluid pressure generating means and a downstream side connected to a sucking port side of the pump, including:

a valve seat having a valve hole;

a ball valve provided in a conduit formed in the housing, that opens the valve hole by separating from the valve seat and closes the valve hole by contacting with the valve seat;

a pin slidably inserted in the valve hole, including a tip portion having a single slant portion defining a plane which is slanted toward a direction away from the slide direction of the pin.

a ball valve provided in the conduit, for opening the valve hole by separating from the valve seat and closing the valve hole by contacting with the valve seat;

a reservoir chamber provided in the housing to communicate with the valve hole and positioned at downstream of the pressure-adjusting valve; and a reservoir piston slidably inserted in the reservoir chamber, and interlocked with the pin, wherein the pin pushes up the ball valve with the tip portion to open the valve hole when fluid reserved in the reservoir chamber is less than a predetermined amount, and the valve hole is closed by the ball valve when the reservoir chamber is filled with the predetermined amount of brake fluid.

9. A pressure-adjusting reservoir, comprising:

a housing having a conduit and a reservoir chamber connected to the conduit;

a pressure-adjusting valve provided between the conduit and the reservoir chamber in the housing, including:

a valve seat having a valve hole;

a pin slidably inserted to the valve hole, and being moved in accordance with a fluid pressure in the reservoir chamber;

a ball valve provided in the conduit, for opening the valve hole by separating from the valve seat by being pushed up by the pin and closing the valve hole by contacting with the valve seat; and movement restraining means having a single slant surface slanted with respect to an axis of the pin, for restraining movement of the ball valve perpendicular to the axis of the pin, wherein said slant surface maintains no more than a point contact with said ball when restraining said ball, wherein said ball is restrained by said slant surface and another element of said pressure-adjusting valve besides said pin.

10. A pressure-adjusting reservoir according to claim 9:
wherein the pin includes a tip portion; and
is provided on the tip portion.

11. A pressure-adjusting reservoir according to claim 10, wherein the pin pushes up the ball valve with the tip portion to open the valve hole when fluid pressure in the reservoir chamber is less than a predetermined value, and the valve hole is closed by the ball valve when the fluid pressure in the reservoir chamber is more than the predetermined value.

12. A pressure-adjusting reservoir according to claim 9, wherein:

the pressure-adjusting valve further comprises a spring for generating a spring force toward the pin side; and the movement restraining means is provided on a guide provided between the ball valve and the spring, for pushing the ball valve toward the pin side by the spring force.

13. A pressure-adjusting reservoir, comprising:

a housing having a conduit and a reservoir chamber connected to the conduit;

a pressure-adjusting valve provided between the conduit and the reservoir chamber in the housing, including:

a valve seat having a valve hole;

a pin slidably inserted to the valve hole, including a tip portion, and being moved in accordance with a fluid pressure in the reservoir chamber; and a ball valve provided in the conduit, for opening the valve hole by separating from the valve seat by being pushed up by the pin and closing the valve hole by contacting with the valve seat, wherein the tip portion of the pin has a contact face to be contacted with the ball valve, and the contact face is formed so that a center line connecting a center of the ball valve and a contact point between the contact face and the ball valve is different from an axis of the pin and wherein the contact face has a single slant surface defining a plane which is slanted toward one direction with respect to the slide direction of the pin.

14. A pressure-adjusting reservoir according to claim 13, wherein the slant surface has a recess portion at a portion where the ball valve is to be contacted with, the recess has a radius of curvature smaller than a radius of the ball valve.

15. A pressure-adjusting reservoir according to claim 14, wherein the recess portion has a shape substantially the same as a shape of a part of the ball valve.

16. A pressure-adjusting reservoir according to claim 14, wherein the recess portion is formed in conical shape.

* * * * *